US008521879B1

(12) United States Patent
Pena et al.

(10) Patent No.: US 8,521,879 B1
(45) Date of Patent: Aug. 27, 2013

(54) SYSTEMS AND METHODS FOR A LOAD BALANCED INTERIOR GATEWAY PROTOCOL INTRANET (75) Inventors: Roger Pena, Atascosa, TX (US); David M. Niedzielski, San Antonio, TX (US)

(73) Assignee: United Services Automobile Assocation (USAA), San Antonio, TX (US)

( * ) Notice: Subject to any disclaimer, the term of this patent is extended or adjusted under 35 U.S.C. 154(b) by 486 days.

(21) Appl. No.: 12/046,127

(22) Filed: Mar. 11, 2008

(51) Int. Cl.
*G06F 15/173* (2006.01)

(52) U.S. Cl.
USPC .......................................................... 709/226

(58) Field of Classification Search
USPC .......................................................... 709/226
See application file for complete search history.

(56) References Cited

U.S. PATENT DOCUMENTS

| | | | |
|---|---|---|---|
| 5,774,660 A | 6/1998 | Brendel et al. | |
| 6,070,191 A | 5/2000 | Narendran et al. | |
| 6,098,091 A | 8/2000 | Kisor | |
| 6,112,239 A | 8/2000 | Kenner et al. | |
| 6,167,438 A | 12/2000 | Yates et al. | |
| 6,397,260 B1 | 5/2002 | Wils et al. | |
| 6,510,469 B1 | 1/2003 | Starnes et al. | |
| 6,549,513 B1 | 4/2003 | Chao et al. | |
| 7,152,179 B1 | 12/2006 | Critchfield | |
| 7,210,147 B1 | 4/2007 | Hipp et al. | |
| 7,464,151 B1 * | 12/2008 | Drennen et al. | 709/223 |
| 7,567,504 B2 | 7/2009 | Darling et al. | |
| 7,881,208 B1 * | 2/2011 | Nosella et al. | 370/242 |
| 2002/0103846 A1 | 8/2002 | Zisapel et al. | |
| 2003/0154236 A1 * | 8/2003 | Dar et al. | 709/201 |
| 2004/0109447 A1 | 6/2004 | Douglass et al. | |
| 2004/0249971 A1 * | 12/2004 | Klinker | 709/239 |
| 2005/0080923 A1 | 4/2005 | Elzur | |
| 2005/0102387 A1 | 5/2005 | Herington | |
| 2005/0249199 A1 | 11/2005 | Albert et al. | |
| 2005/0259632 A1 | 11/2005 | Malpani et al. | |
| 2005/0262246 A1 * | 11/2005 | Menon et al. | 709/226 |
| 2006/0112170 A1 | 5/2006 | Sirkin | |
| 2006/0171303 A1 | 8/2006 | Kashyap | |
| 2006/0193247 A1 | 8/2006 | Naseh et al. | |
| 2006/0193252 A1 | 8/2006 | Naseh et al. | |
| 2006/0195607 A1 * | 8/2006 | Naseh et al. | 709/238 |
| 2008/0235400 A1 | 9/2008 | Slocombe et al. | |
| 2010/0002576 A1 * | 1/2010 | Hu | 370/217 |

OTHER PUBLICATIONS

Cisco Systems, Inc., VLAN Load Balancing Between Trunks Using the Spanning-Tree Protocol Port Priority, Aug. 30, 2005, http://www.cisco.com/warp/public/473/15.pdf (accessed Feb. 27, 2008).
Cisco Systems, Inc., Site-to-Site Recovery Using IGP and BGP, Mar. 2004, http://www.cisco.com/en/US/solutions/ns340/ns517/ns224ins378/net_design_guidance0900aecd80122a78.pdf (accessed Feb. 27, 2008).

(Continued)

*Primary Examiner* — Steven H Nguyen
*Assistant Examiner* — Saad A Waqas
(74) *Attorney, Agent, or Firm* — Brooks, Cameron & Huebsch, PLLC (57) ABSTRACT

The present disclosure provides systems and methods for an intranet. An intranet can include a number of layer 3 networks including a number of servers associated with load balancers for advertising a virtual network address for the number of servers. The number of servers can also be interconnected via a number of layer 2 links.

21 Claims, 5 Drawing Sheets

(56) References Cited

OTHER PUBLICATIONS

Jalercom, S.A. DE C.V., LB-8000 Server Load Balancer, http://www.conecsion.es/DocDoc/C-LB8000-1%5B1%5D.pdf (accessed Feb. 27, 2008).

Hoch, Darren, Configuring a 2 Node Apache HA Cluster, UUASC, Jun. 2007, http://www.ufsdump.org/papers/uuasc-ha-cluster-june-2007.pdf (accessed Feb. 27, 2008).

Lee, Richard R., The Management of MS Cluster Server (MSCS) Computing Environments, http://www.microsoft.com/technet/archive/winntas/maintain/cluster.mspx?mfr=true (accessed Feb. 27, 2008).

Symantec Corporation, White Paper: Enterprise Solutions, http://www.coopseminar.com/pdf/BusinessContinuity-SymantecIntelligentApplicationRecoverySolutionsGuide.pdf (accessed Feb. 27, 2008).

Symantec Corporation, White Paper: High Availability and Disaster Recovery, http://eval.symantec.com/mktginfo/enterprise/white_papers/b-whitepaper_vcs_hadr_13584866_01_08.en-us.pdf (accessed Feb. 27, 2008).

Ybarra, Paul et al., Capacity Planning Analyses of Large Data Networks: A Case Study, http://regions..cmg.org/regions/swcmg/downloads/9909Ybarra.doc (accessed Feb. 27, 2008).

* cited by examiner

SYSTEMS AND METHODS FOR A LOAD BALANCED INTERIOR GATEWAY PROTOCOL INTRANET

CROSS REFERENCE TO RELATED APPLICATIONS

This application is related in subject matter to, and incorporates herein by reference in its entirety, each of the following: U.S. patent application entitled "Systems and Methods for an Intranet," Ser. No. 12/046,163, filed on the same date as this application; and U.S. patent application entitled "Systems and Methods for an Intranet," Ser. No. 12/046,201, also filed on the same date as this application.

BACKGROUND

An intranetwork (intranet) may include a number of data centers. A data center is a facility that houses one or more computing systems for a business, industry, governmental entity, or other organization. Such computing systems may include, for example, one or more servers or server clusters that perform various functions for the organization.

Examples of such functions include hosting web sites, storing information, and providing processing for computing applications, among others. Other computing systems may be housed in a data center for performing other functions.

Information and application processing associated with a data center may be important to particular organizations. Such information and application processing may be associated with one or more stand alone servers and/or server clusters (these are generally referred to herein as "servers").

Various efforts have been made to provide high availability servers. For example, some servers are provided with physical security such as housing the server in a data center in an inconspicuous location, providing restricted access to the server, providing the server with environmental isolation and control, and/or providing electrical power supply redundancy to the server. An element of security that has been added to data center design is to provide an organization with more than one physical data center (e.g., providing multiple data centers at different locations).

Providing "redundant" (also called "backup") servers may provide an organization with the ability to protect server functionality against harmful factors that may otherwise create a single point of failure. For example, a single server may be vulnerable to physical failure (e.g., from terrorist activity, fire, earthquake, etc).

A single server and/or the applications hosted by the server may also be vulnerable to electronic failure (e.g., "hacker" activity or unplanned hardware failure events) such as viruses, broadcast storms, denial of service attacks, network device failures, storage device failures, and the like. Further, a single server associated with a data center may be vulnerable to electric and/or telecommunications failure of such a magnitude that hardware and software equipment internal to the data center may be unable to mitigate the failure.

Other failures reducing or eliminating the functionality of a single server are possible. In such instances, having additional servers, such as at separate geographic locations, may provide the organization with the ability to maintain server functionality after the loss of a single server.

A goal in providing a high availability intranet may be eliminating single points of failure. However, providing certain areas of redundancy in a network may create other issues such as broadcast stomis and/or "split-brain" problems.

A broadcast storm can, for example, be caused by network traffic that circulates through the network and generates response traffic from a number of computing devices on the network causing a flood of traffic that may prevent the network from being used for meaningful traffic if the storm is not stopped or prevented. Such situations may arise, for example, from having redundant links between two or more network devices that forward broadcasts such that each device may forward the broadcast traffic to the other in a loop.

A split-brain problem may exist, for example, when a redundant passive server is provided to host applications in the event an active server hosting the one or more applications fails. If a mechanism that allows the active and passive servers to determine whether the other server is functioning fails, both the active and the passive servers may operate on the premise that the other server is not functioning, thus providing two active servers where application hosting may be divided between the two such that the two active servers simultaneously attempt to access shared resources, among other functions they may perform in duplicate.

SUMMARY

In one or more embodiments, an intranet system includes an Internet protocol (IP) core and a number of electronic communities, each having at least two layer 3 links to the IP core. The system also includes a first layer 3 network connected to the IP core, including a first layer 4 load balancer that advertises a virtual network address and a first server connected to the first layer 4 load balancer.

The system further includes a second layer 3 network connected to the IP core, including a second layer 4 load balancer that advertises the virtual network address and a second server connected to the second layer 4 load balancer. The system includes at least two layer 2 links between the first and second servers.

According to one or more embodiments of the present disclosure, a method for administering an intranet includes providing an Internet protocol (IP) core and connecting each of a number of electronic communities to the IP core via at least two layer 3 links. The method can also include connecting a first layer 3 network to the IP core, including advertising a virtual network address via a first layer 4 load balancer and connecting a first server to the first layer 4 load balancer.

In various embodiments, the method includes connecting a second layer 3 network to the IP core, including advertising the virtual network address via a second layer 4 load balancer and connecting a second server to the second layer 4 load balancer. Such methods can include connecting the first and the second servers via at least two layer 2 links.

One or more embodiments of the present disclosure include a computing device readable medium having instructions stored thereon, which, when executed by a number of processors, causes a number of devices to perform a method associated with an intranet, including providing an Internet protocol (IP) core and connecting each of a number of electronic communities to the IP core via at least two layer 3 links. The method can include connecting a first layer 3 network to the IP core, including advertising a virtual network address via a first layer 4 load balancer and connecting a first server to the first layer 4 load balancer.

In some such embodiments, the method includes connecting a second layer 3 network to the IP core, including advertising the virtual network address via a second layer 4 load balancer and connecting a second server to the second layer 4 load balancer. The method can include connecting the first and the second servers via at least two layer 2 links.

In one or more embodiments, an intranet system includes an Internet protocol (IP) core and a number of electronic communities, each having at least two layer 3 links to the IP core. The system can include a first layer 3 network connected to the IP core, including a first layer 4 load balancer that advertises a virtual network address and performs health checks on a first server connected to the first layer 4 load balancer. The first server can monitor advertisement of the virtual network address by the first layer 4 load balancer.

The system can include a second layer 3 network connected to the IP core, including a second layer 4 load balancer and a second server connected to the second layer 4 load balancer. In some embodiments, the system includes at least two layer 2 links between the first and the second servers.

In the system, the first load balancer ceases to advertise the virtual network address when a result of the health check indicates a particular criteria. In some such embodiments, the second load balancer can advertise the virtual network address when the first load balancer ceases to advertise the virtual network address.

According to one or more embodiments of the present disclosure, a method for administering an intranet includes providing an Internet protocol (IP) core and connecting each of a number of electronic communities to the IP core via at least two layer 3 links. The method can include connecting a first layer 3 network to the IP core, including a first layer 4 load balancer for advertising a virtual network address and performing health checks on a first server connected to the first layer 4 load balancer. The method can include monitoring advertisement of the virtual network address by the first layer 4 load balancer with the first server.

In various embodiments, the method includes connecting a second layer 3 network to the IP core, including connecting a second server to a second layer 4 load balancer. In such embodiments, the method includes connecting the first and the second servers via at least two layer 2 links.

In some embodiments, the method includes ceasing advertising the virtual network address with the first layer 4 load balancer when a result of the health check indicates a particular criteria. The method can include advertising the virtual network address with the second load balancer when the first load balancer ceases advertising the virtual network address.

One or more embodiments of the present disclosure include a computing device readable medium having instructions stored thereon, which, when executed by a number of processors, causes a number of devices to perform a method associated with an intranet, including providing an Internet protocol (IP) core and connecting each of a number of electronic communities to the IP core via at least two layer 3 links. In some embodiments, the method includes connecting a first layer 3 network to the IP core, including a first layer 4 load balancer for advertising a virtual network address and performing health checks on a first server connected to the first layer 4 load balancer. The method can include monitoring advertisement of the virtual network address by the first layer 4 load balancer with the first server.

The method can include connecting a second layer 3 network to the IP core, including connecting a second server to a second layer 4 load balancer. In various embodiments, the method includes connecting the first and the second servers via at least two layer 2 links.

The method can include ceasing advertising the virtual network address with the first layer 4 load balancer when a result of the health check indicates a particular criteria. In such embodiments, the method can include advertising the virtual network address with the second load balancer when the first load balancer ceases advertising the virtual network address.

In one or more embodiments of the present disclosure, an intranet system includes a first layer 3 network, including a first load balancer connected to a first server cluster. The first load balancer, for example, can perform first health checks on the first server cluster, advertise a virtual network address according to results of the first health checks, and/or cease to advertise the virtual network address when a result of the first health checks indicates a particular criteria. The first server cluster can monitor advertisement of the virtual network address by the first load balancer.

In some such embodiments, the system can include a second layer 3 network, including a second load balancer connected to a second server cluster. The second load balancer, for example, performs second health checks on the second server cluster and advertises the virtual network address according to results of the second health checks when the first load balancer ceases to advertise the virtual network address. The second server cluster can monitor advertisement of the virtual network address by the second load balancer. The system can include at least two layer 2 links between the first and the second server clusters.

According to one or more embodiments of the present disclosure, a method for administering an intranet includes connecting a first load balancer to a first server cluster in a first layer 3 network. In such embodiments, the method can include using the first load balancer for performing first health checks on the first server cluster, advertising a virtual network address according to results of the first health checks, and ceasing advertising of the virtual network address when a result of the first health checks indicates a particular criteria. The method can include monitoring advertisement of the virtual network address by the first load balancer with the first server cluster.

In some embodiments, the method can include connecting a second load balancer to a second server cluster in a second layer 3 network. The method can include using the second load balancer for performing second health checks on the second server cluster and advertising the virtual network address according to results of the second health checks when the first load balancer ceases advertising the virtual network address. The method can include monitoring advertisement of the virtual network address by the second load balancer with the second server cluster. In some embodiments, the method includes connecting the first and the second server clusters with at least two layer 2 links.

One or more embodiments of the present disclosure include a computing device readable medium having instructions stored thereon, which, when executed by a number of processors, causes a number of devices to perform a method associated with an intranet, including connecting a first load balancer to a first server cluster in a first layer 3 network. In some such embodiments, the method includes using the first load balancer for performing first health checks on the first server cluster, advertising a virtual network address according to results of the first health checks, and ceasing advertising of the virtual network address when a result of the first health checks indicates a particular criteria. The method can include monitoring advertisement of the virtual network address by the first load balancer with the first server cluster.

The method can include connecting a second load balancer to a second server cluster in a second layer 3 network. In some embodiments, the method includes using the second load balancer for performing second health checks on the second server cluster and advertising the virtual network address according to results of the second health checks when the first load balancer ceases advertising the virtual network address. The method can include monitoring advertisement of the virtual network address by the second load balancer with the second server cluster. The method can include connecting the first and the second server clusters with at least two layer 2 links.

DETAILED DESCRIPTION

As used herein, layer 2, layer 3, and layer 4 refer to various layers of one of the TCP/IP model and the Open Systems Interconnection (OSI) model. Layer 2 can refer to a data link layer, layer 3 can refer to a network layer, and layer 4 can refer to a transport layer. The various layers of either model will be understood by one of ordinary skill in the art. A layer 4 load balancer can refer to a device that operates at the transport layer level, for example, to route traffic having a virtual network address as a destination address to one of a number of actual devices (e.g., servers) associated with the virtual network address.

The present disclosure provides systems and methods for an intranet. An intranet can include a number of layer 3 networks including a number of servers associated with load balancers for advertising a virtual network address for the number of servers. The number of servers can also be interconnected via a number of layer 2 links.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as 202 in FIG. 2.

Figure 1:
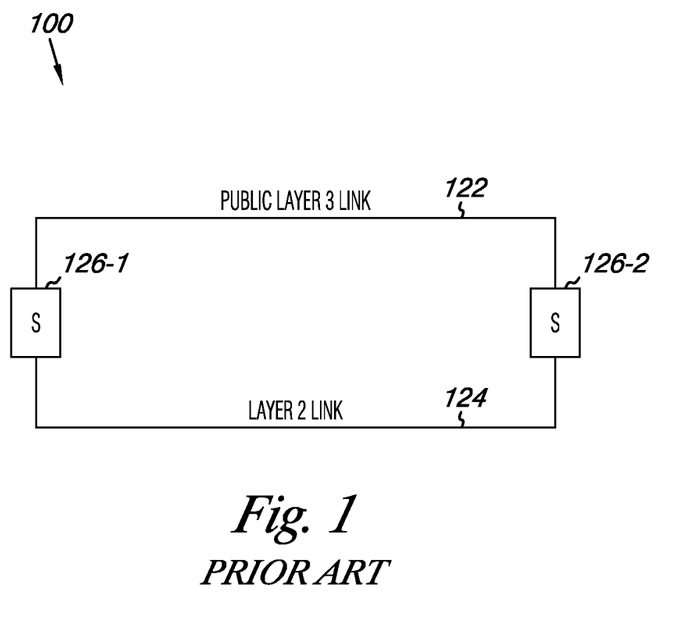
FIG. 1 illustrates a block diagram of a redundant system according to a previous approach.

FIG. 1 illustrates a block diagram of a redundant system according to a previous approach. The redundant system 100 illustrated in FIG. 1 includes two single servers or two server clusters (both generally referred to herein as "servers") 126-1 and 126-2. It will be appreciated that a "server" or "server cluster" can include one or more servers and/or one or more server clusters. The servers 126-1 and 126-2 are connected via a public layer 3 link 122 and a layer 2 link 124. Server 126-1 and server 126-2 can communicate via either the layer 2 link 124 or the public layer 3 link 122, which can provide redundancy for the system 100.

However, a broadcast storm can occur because of such redundant links between server 126-1 and server 126-2. For example, server 126-1 could broadcast traffic using both the public layer 3 link 122 and the layer 2 link 124. Server 126-2 could receive the broadcast via link 122 and forward the broadcast traffic via link 124. Likewise, server 126-2 could receive the broadcast via link 124 and forward the broadcast traffic via link 122.

Such an occurrence could result in a broadcast storm. As the layer 3 link 122 is public, such a broadcast storm could affect a larger intranet system connected to the redundant system 100 illustrated in FIG. 1.

In some instances, server 126-1 can be an active, primary server. An active server can be a server that is hosting applications for one or more clients, for example. In such instances, server 126-2 can be a passive, secondary server. A passive server can be a server that is not hosting applications when passive, but can become active to compensate for a lack of functionality associated with server 126-1.

For example, server 126-2 can have a layer 2 heartbeat with server 126-1 to determine whether server 126-1 is functional. When the heartbeat indicates that server 126-1 is functional, server 126-2 can remain passive.

When the heartbeat indicates that server 126-1 is not functional, server 126-2 can become active. However, if the layer 2 link 124 malfunctioned such that server 126-2 could not indicate functionality via the heartbeat while server 126-1 is active and functional, then server 126-2 could become active at the same time as server 126-1. Such a "split brain" problem can cause application processing errors, among other errors in a network, such as redundant system 100.

Figure 2A:
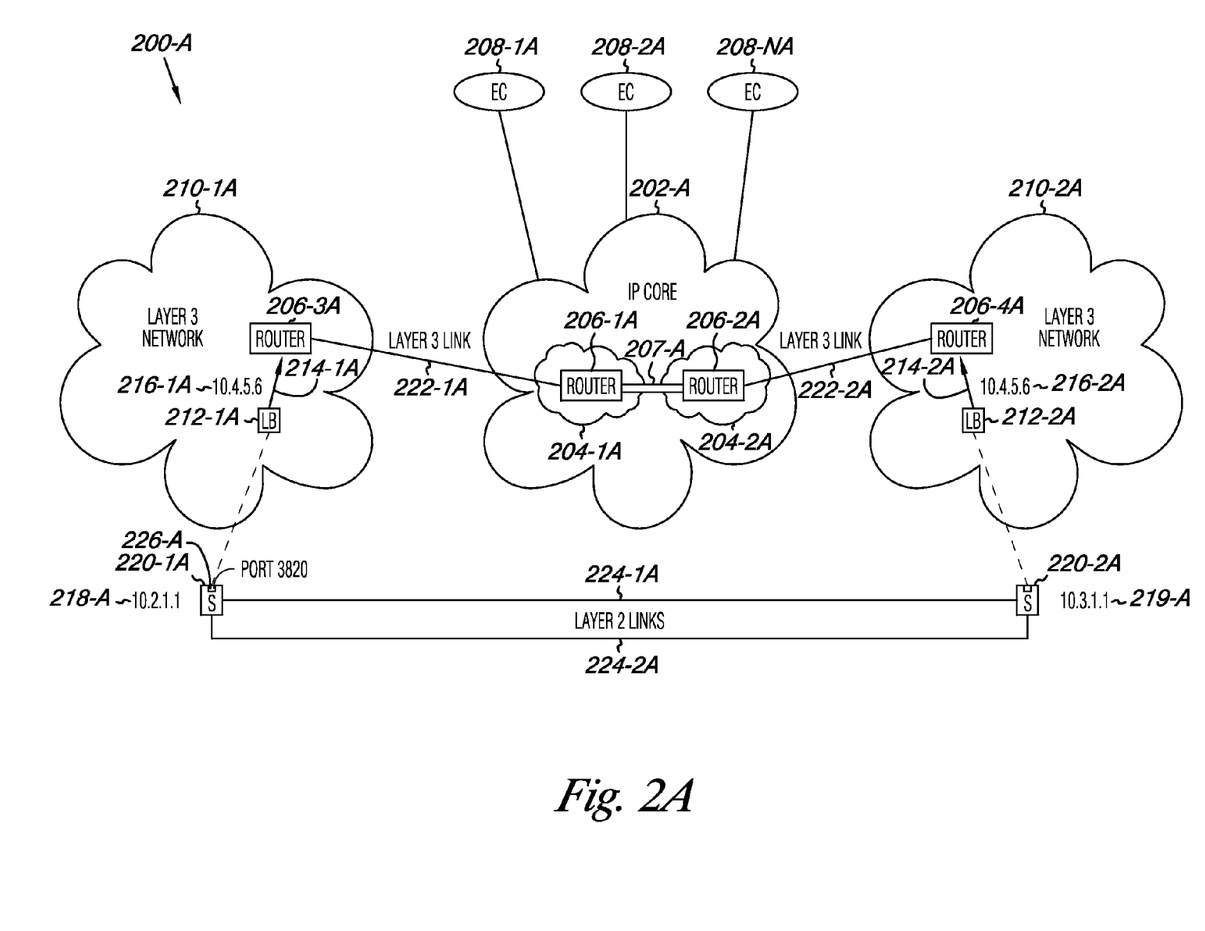
FIG. 2A illustrates a block diagram of an intranet system having two active load balancers according to one or more embodiments of the present disclosure.
Figure 2B:
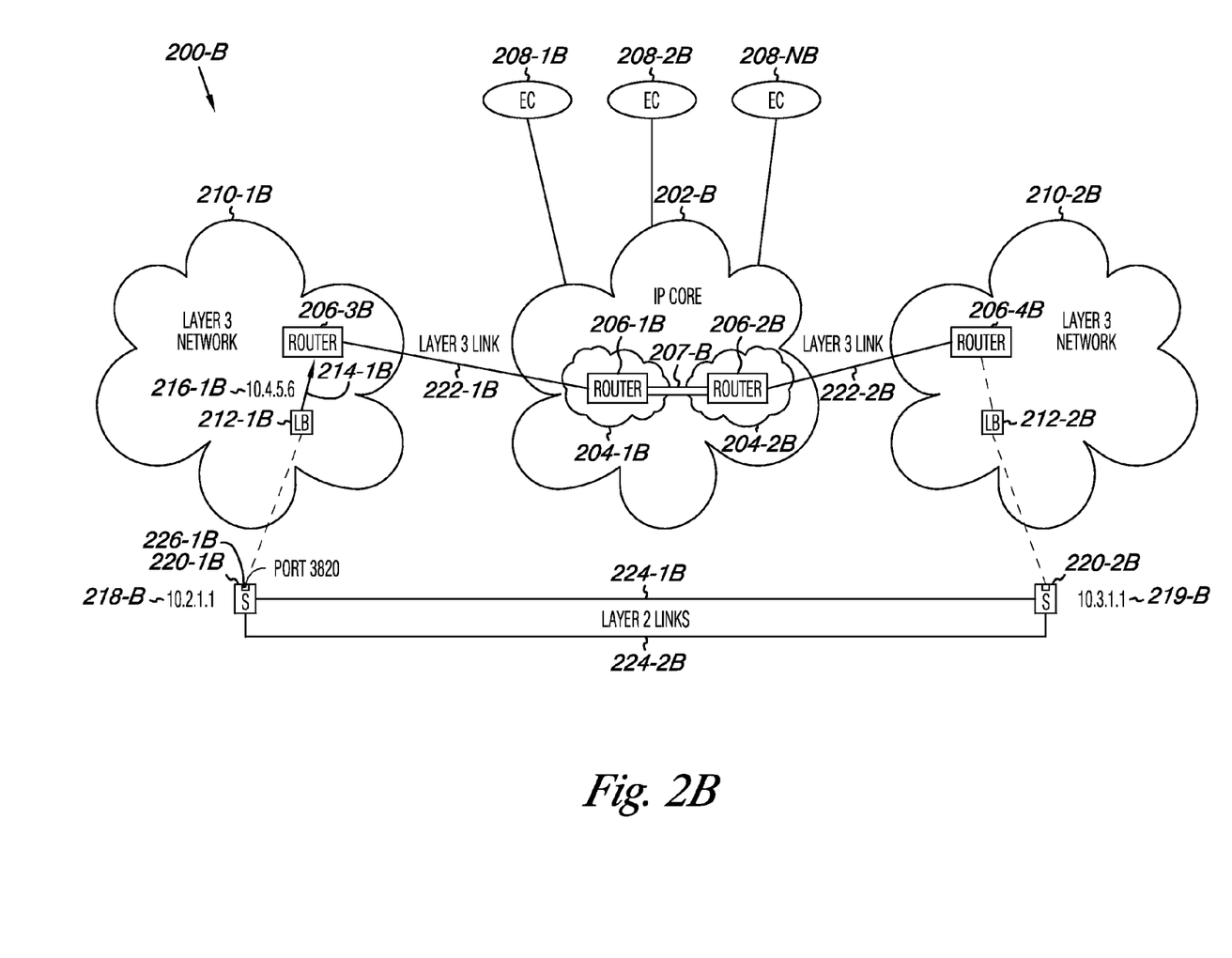
FIG. 2B illustrates a block diagram of an intranet system having one active and one passive load balancer according to one or more embodiments of the present disclosure.
Figure 2C:
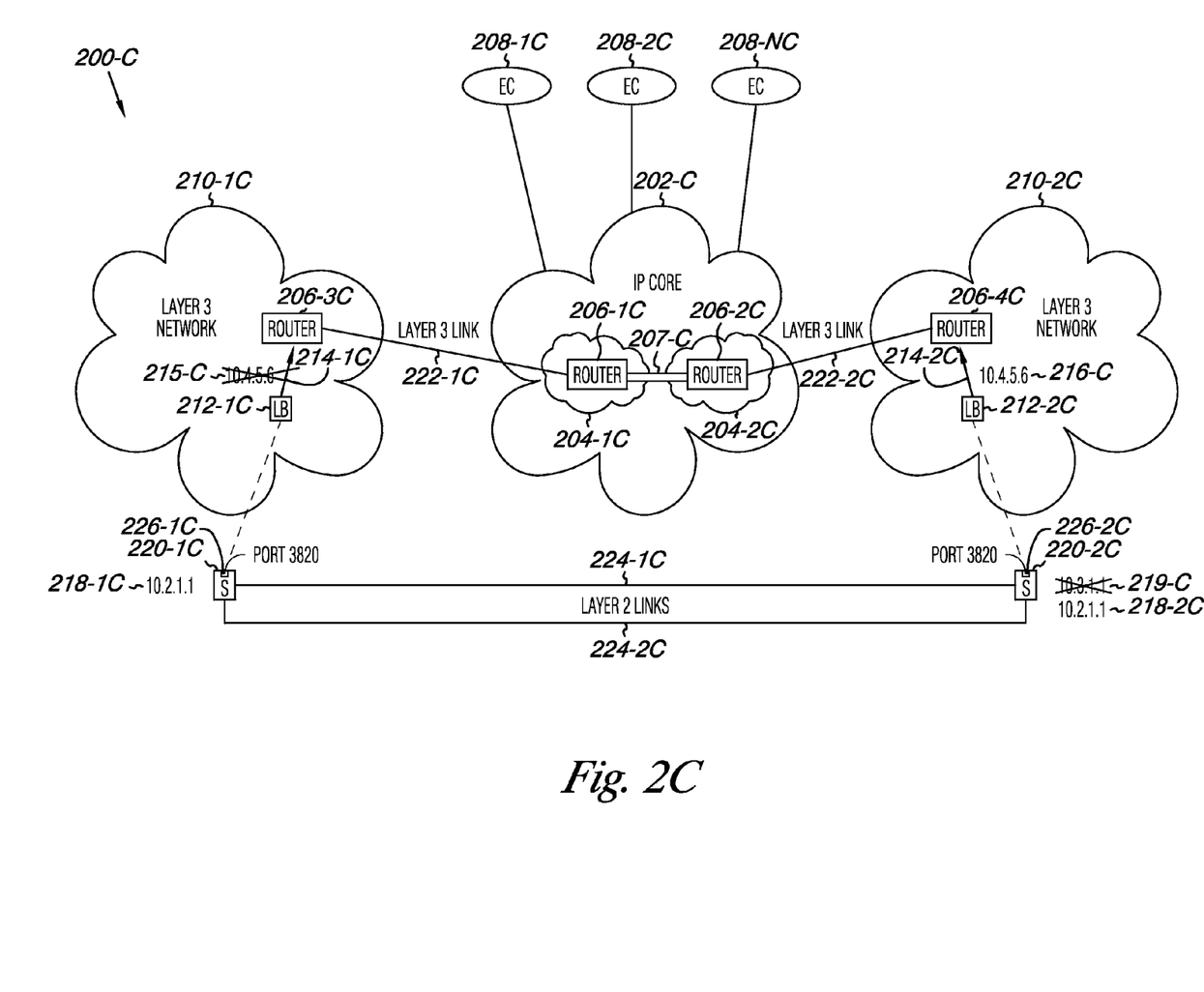
FIG. 2C illustrates a block diagram of an intranet system at failover according to one or more embodiments of the present disclosure.

FIGS. 2A-2C illustrate block diagrams of intranet systems according to one or more embodiments of the present disclosure. According to one or more embodiments of the present disclosure, various components of the intranet systems 200-A, 200-B, and 200-C can include logic such as an application specific integrated circuit (ASIC), a processor, a controller, an application specific integrated circuit, and/or the like.

The processor may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("DRAM"), EEPROM, flash memory, and/or the like.

FIG. 2A illustrates a block diagram of an intranet system having two active load balancers according to one or more embodiments of the present disclosure. The intranet system 200-A includes an Internet protocol (IP) core cloud 202-A indicating a backbone for the intranet system 200-A. The IP core 202-A is segmented into two portions 204-1A and 204-2A, each including a router (e.g., 206-1A and 206-2A) that is interconnected 207-A to provide a redundant intranet backbone.

In the embodiment of FIG. 2A, the IP core 202-A is connected to a number of electronic communities 208-1A, 208-2A, and 208-NA. As used herein, the designator "N" indicates that a number of electronic communities may be connected to the IP core.

The number of electronic communities is not limited to the number presented in this example embodiment. Electronic communities are described in more detail below in connection with FIG. 3, however, each electronic community can have at least two layer 3 links to the IP core 202-A.

In the embodiment of FIG. 2A, routers 206-1A and 206-2A in the IP core segments 204-1A and 204-2A are connected to routers 206-3A and 206-4A in a number of layer 3 networks 210-1A and 210-2A. Although two layer 3 networks are illustrated in FIGS. 2A-2C, embodiments are not limited to a particular number of layer 3 networks.

Each layer 3 network 210-1A and 210-2A can include a layer 4 load balancer 212-1A and 212-2A that advertises 214-1A and 214-2A a virtual network address 216-1A and 216-2A (e.g., 10.4.5.6). Advertising a network address can include identifying a route for traffic having a particular destination address to upstream network components such as routers. That is, advertising a network address can instruct upstream routers to direct traffic for that address to, or through, the source of the advertisement.

The virtual network address can be advertised for a server. For example, load balancer 212-1A can advertise 214-1A the virtual network address 216-1A for server 220-1A. As indicated in the embodiment of FIG. 2A, the virtual network address can be associated with a port 226-A (e.g., port 3820) on a server 220-1A.

Although the example IP addresses illustrated in FIGS. 2A-2C may appear in an Internet protocol version four (IPv4) form, embodiments are not so limited. For example, embodiments of the present disclosure can be practiced using Internet protocol version six (IPv6) and/or other network protocols.

The virtual network address can be advertised upstream, for example, using route health injection (RHI) to a number of routing tables of routers upstream (e.g., routers such as router 206-3A). Embodiments of the present disclosure that include virtual private networks (VPNs) can include the use of reverse route injection (RRI) to inject a route into a number of routing tables upstream from a load balancer.

Load balancers can balance network traffic (e.g., from a number of clients), both within a particular server cluster and/or between a number of server clusters. As such, load balancers can be connected to a server (e.g., load balancer 212-1A can be connected to server 220-1A through the layer 3 network 210-1A). As will be described in more detail below, load balancers can receive health check information by performing health checks on a number of servers in a server cluster.

In one or more embodiments, a load balancer can perform a health check on a number of servers to determine whether the servers and/or applications running thereon meet one or more particular criteria (e.g., whether they are functional and/or whether traffic should continue to be routed to the servers). Such information can be used by a load balancer to cease to advertise the virtual network address when the health check indicates that one or more particular criteria are present (e.g., insufficient functionality of a server) so that traffic is no longer routed to that server (e.g., the load balancer can initiate a failover of network traffic from one server to another). The number of servers can monitor advertisement of the virtual network address through the layer 4 load balancers. Accordingly, the system can include bi-directional monitoring of health between the servers and load balancers, as well as server to server.

The embodiment illustrated in FIG. 2A can depict an intranet system 200-A including two simultaneously active servers 220-1A and 220-2A. In one or more embodiments, a routing protocol, such as open shortest path first (OSPF), can be used on an interior gateway protocol (IGP) network to route traffic to one of the servers 220-1A and 220-2A. A network path selected by one or more routers for traffic from a client (e.g., a client located in electronic community 208-1A) to a server can be the topographically shortest route (e.g., the route which may provide the highest speed for traffic flow to/from the client, the fewest number of hops, and/or the lowest cost metric), depending on the particular routing configuration employed.

In the embodiment of FIG. 2A, the load balancers 212-1A and 212-2A can advertise the virtual network address through the layer 3 networks 210-1A and 210-2A, over the layer 3 links 222-1A and 222-2A, and to the number of electronic communities 208-1A, 208-2A, and/or 208-NA. Accordingly, traffic can be routed from an electronic community to a server using OSPF protocol.

As used herein, an active server is a server that has a virtual network address advertised upstream (e.g., having a load balancer that advertises a single virtual network address upstream). An active server can handle (e.g., receive, process, and/or send), network traffic (e.g., packets). Each server and/or server cluster can be associated with a data center. Server 220-1A can have at least two layer 2 links 224-1A and 224-2A to server 220-2A. Heartbeats and cluster configuration information can be communicated across the layer 2 links 224-1A and 224-2A using low latency transport (LLT) protocol. Having at least two layer 2 links can provide for LLT redundancy, among other benefits. Data can be replicated across fiber channel or Ethernet links between server 220-1A and 220-2A such that one version of the data is stored on each server.

According to one or more embodiments of the present disclosure, data replication can be accomplished in a manner to effectively implement the goals of atomicity, consistency, isolation, and/or durability (ACID). Atomicity can refer to each component of an operation being completed before the operation is validated. Consistency can refer to ensuring that data and data organization follow a number of established parameters for a particular database. Isolation can refer to preventing multiple operations from affecting a particular data value simultaneously. Durability can refer to properly recording a validated (e.g., successful), operation such that any data values affected by the operation are stored in their affected state, rather than a previous unaffected state.

Servers 220-1A and 220-2A can be one or more particular types of servers, such as web servers, application servers, file servers, email servers, print servers, database servers, etc. A server cluster can include multiple servers facilitating one or more common and/or different functions. For example, an email server cluster could include multiple servers cooperatively providing access to email for an organization operating and/or leasing the server cluster. A server cluster can include servers providing functions different from one another (e.g., application servers, email servers, web servers, etc).

The servers 220-1A and 220-2A can be on different layer 2 networks. Such a network design can help prevent broadcast storms, among other benefits particularly as compared to a network design including servers and counterpart servers on the same layer 2 network. In some embodiments, the servers 220-1A and 220-2A can have different actual network addresses 218-A (e.g., 10.2.1.1) and 219-A (e.g., 10.3.1.1).

This number of redundancies provided in the intranet system 200-A can allow the system to retain functionality after the failure of any single system component. That is, the intranet system 200-A can eliminate network components as single points of failure.

FIG. 2B illustrates a block diagram of an intranet system having one active and one passive load balancer according to one or more embodiments of the present disclosure. In the embodiment of FIG. 2B, the intranet system 200-B includes an IP core cloud 202-B indicating a backbone for the intranet system 200-B. The IP core 202-B is segmented into two portions 204-1B and 204-2B, each including a router 206-1B and 206-2B that is interconnected 207-B to provide a redundant intranet backbone.

The IP core 202-B is connected to a number of electronic communities 208-1B, 208-2B, and 208-NB. Electronic communities are described in more detail below in connection with FIG. 3, however each electronic community can have at least two layer 3 links to the IP core 202-B. Routers 206-1B and 206-2B in the IP core segments 204-1B and 204-2B are connected to routers 206-3B and 206-4B in a number of layer 3 networks 210-1B and 210-2B.

One layer 3 network 210-1B can include a layer 4 load balancer 212-1B that advertises 214-1B a virtual network address 216-1B (e.g., 10.4.5.6). The virtual network address can be advertised for a server. For example, load balancer 212-1B can advertise 214-1B the virtual network address 216-1B for server 220-1B.

The virtual network address can be associated with a port 226-1B (e.g., port 3820) on a server 220-1B. The load balancer 212-1B can perform health checks on the server 220-1B and can cease to advertise the virtual network address (e.g., as is shown in FIG. 2C at 215-C) when a result of the health check indicates one or more particular criteria are present. Particular criteria can include at least a partial lack of functionality of the server or an application running thereon, among other criteria.

Another layer 3 network 210-2B can include a layer 4 load balancer 212-2B connected to a server 220-2B. The load balancer 212-2B can generally be passive (e.g., not advertising the virtual network address). However, the load balancer 212-2B can advertise the virtual network address when load balancer 212-1B ceases to do so (e.g., as illustrated in FIG. 2C).

In the embodiment of FIG. 2B, the load balancers 212-1B and 212-2B can advertise the virtual network address through the layer 3 networks 210-1B and 210-2B, over the layer 3 links 222-1B and 222-2B, and to the number of electronic communities 208-1B, 208-2B, and/or 208-NB. Accordingly, traffic can be routed from an electronic community to a server using OSPF protocol.

Server 220-1B can have at least two layer 2 links 224-1B and 224-2B to server 220-2B. Heartbeat and cluster information can communicate across the layer 2 links 224-1B and 224-2B using low latency transport (LLT) protocol such that one version of data is stored on each server.

The load balancer 212-2B can ping the load balancer 212-1B when the load balancer 212-1B is advertising 214-1B the virtual network address 216-1B. Such pinging can be useful for the load balancer 212-2B to determine whether the load balancer 212-1B is functioning properly, and therefore whether the load balancer 212-2B should begin advertising the virtual network address (e.g., as shown in FIG. 2C).

The servers 220-1B and 220-2B can be assigned different actual network addresses 218-B (e.g., 10.2.1.1) and 219-B (e.g., 10.3.1.1). The actual network address 218-B associated with the active server 220-1B can be reassigned (as illustrated in FIG. 2C at 219-C and 218-2C) to server 220-2B when the load balancer 212-1B ceases to advertise the virtual network address and the load balancer 212-2B begins to advertise the virtual network address.

The virtual network address can be associated with a particular port 226-1B on the servers 220-1B and 220-2B (e.g., port 3820). When load balancer 212-1B is advertising the virtual network address, the particular port 226-1B can be open on the server 220-1B and closed on the server 220-2B, as illustrated in FIG. 2B. When load balancer 212-1B ceases to advertise the virtual network address, the particular port 226-1B can be open on server 220-2B and closed on server 220-1B (e.g., as illustrated in FIG. 2C at port 226-2C for server 220-2C).

FIG. 2C illustrates a block diagram of an intranet system at failover according to one or more embodiments of the present disclosure. The intranet system 200-C includes an IP core cloud 202-C indicating a backbone for the intranet system 200-C. The IP core 202-C is segmented into two portions 204-1C and 204-2C, each including a router 206-1C and 206-2C that is interconnected 207-C to provide a redundant intranet backbone.

The IP core 202-C is connected to a number of electronic communities 208-1C, 208-2C, and 208-NC. Electronic communities are described in more detail below in connection with FIG. 3, however each electronic community can have at least two layer 3 links to the IP core 202-C. Routers 206-1C and 206-2C in the IP core segments 204-1C and 204-2C are connected to routers 206-3C and 206-4C in a number of layer 3 networks 210-1C and 210-2C.

Analogous to the discussion above with respect to FIG. 2B, load balancer 212-2C on layer 3 network 210-2C can advertise 214-2C the virtual network address 216-C when load balancer 212-1C on layer 3 network 210-1C ceases advertising 215-C the virtual network address. The load balancer 212-2C can perform health checks on the server 220-2C and can advertise 214-2C the virtual network address 216-C according to the results of the health checks when the load balancer 212-1C ceases advertising 215-C the virtual network address.

The load balancer 212-1C can perform health checks on the server 220-1C and can cease to advertise the virtual network address when the results of the one or more health checks indicates one or more particular criteria. The server 220-1C can monitor advertisement of the virtual network address via the load balancer 212-1C. Particular criteria can be indicated for a number of resources such as a number of servers in server clusters, a number of applications running in the servers and/or server clusters, a virtual network address, a file system, a storage volume, virtual names, and/or other resources. Application and resource dependencies of the resource for which a particular criteria has been indicated can also "failover" to other servers, server clusters, and/or networks. For example, when a particular resource is faulted on server 220-1C, the particular resource, as well as other resources that utilize the particular resource, can failover to server 220-2C.

In the embodiment of FIG. 2C, the load balancers 212-1C and 212-2C can advertise the virtual network address through the layer 3 networks 210-1C and 210-2C, over the layer 3 links 222-1C and 222-2C, and to the number of electronic communities 208-1C, 208-2C, and/or 208-NC. Accordingly, traffic can be routed from an electronic community to a server using OSPF protocol.

After load balancer 212-1C ceases advertising the virtual network address, the load balancer 212-2C can release the virtual network address back to the load balancer 212-1C on a server-by-server basis and/or on a application-by-application basis according to the results of health checks by the load balancer 212-1C. Such controlled fallback can be beneficial in helping to prevent server "ping pong" where application processing can bounce back and forth between different servers.

Releasing the virtual network address on a server-by-server basis can include releasing the virtual network address for those servers that pass a health check (e.g., those servers having health checks that do not indicate the particular criteria). Likewise, releasing the virtual network address on an application-by-application basis can include releasing the virtual network address for those applications that pass a health check.

The intranet system 200-C can be configured to prevent application processing from shifting between servers and/or server clusters more than once during a given period. For example, after load balancer 212-1C ceases advertising the virtual network address and/or after load balancer 212-2C releases the virtual network address back to load balancer 212-1C, load balancer 212-1C can be configured such that it will not cease advertising the virtual network address again for at least a given period of time.

In one or more embodiments, the intranet system 200-C can be configured to prevent application processing from shifting from server 220-1C to server 220-2C after application processing shifts more than once in a given time period. That is, if application processing has shifted twice in the given time period, the system can be configured such that any further shifts can be prevented, as a possible cause of the shifts may be other than a type of error that can adequately be addressed by failover. By way of example and not by way of limitation, such prevention can be effected by configuring a particular load balancer not to release advertising of the virtual network address more than once in a given period.

The servers 220-1C and 220-2C can be assigned different actual network addresses 218-1C (e.g., 10.2.1.1) and 219-C (e.g., 10.3.1.1). The actual network address 218-1C associated with the active server 220-1C can be reassigned to server 220-2C (e.g., as actual network address 218-2C) when the load balancer 212-1C ceases to advertise the virtual network address and the load balancer 212-2C begins to advertise the virtual network address.

Server 220-1C can have at least two layer 2 links 224-1C and 224-2C to server 220-2C. Heartbeat and cluster information can communicate across the layer 2 links 224-1C and 224-2C using low latency transport (LLT) protocol such that one version of data is stored on each server.

Figure 3:
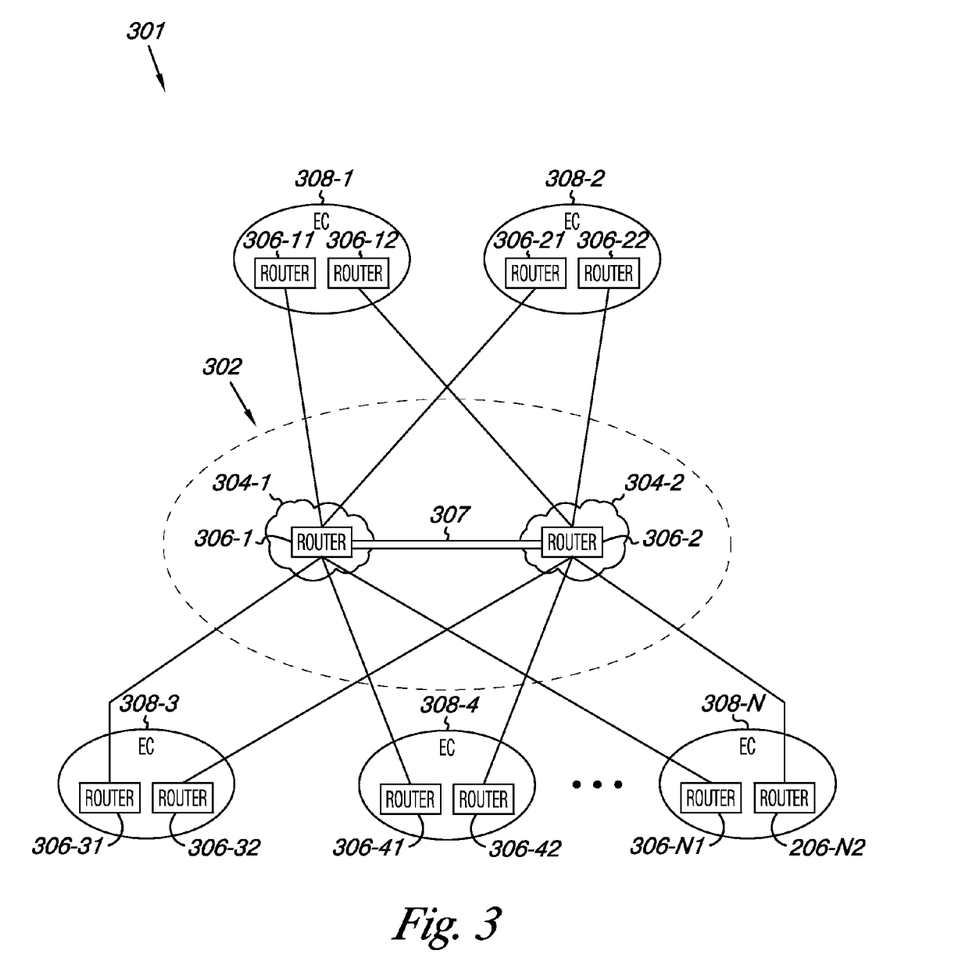
FIG. 3 illustrates a block diagram of a portion of an intranet system including links between electronic communities and an Internet protocol (IP) core according to one or more embodiments of the present disclosure.

FIG. 3 illustrates a block diagram of a portion of an intranet system including links between electronic communities and an Internet protocol (IP) core according to one or more embodiments of the present disclosure. The portion 301 of the intranet system includes an IP core 302 indicating a backbone for the intranet system. In the embodiment of FIG. 3, the IP core 302 is segmented into two portions 304-1 and 304-2, each including a router 306-1 and 306-2 that is interconnected 307 to provide a redundant intranet backbone.

The IP core 302 can be linked to a number of electronic communities (e.g., 308-1, 308-2, 308-3, 308-4, and/or 308-N). Each electronic community can have at least two layer 3 links to the IP core 302.

The two layer 3 links from each electronic community to the IP core can be provided in the form of redundant routers. For example, electronic community 308-1 includes routers 306-11 and 306-12 linked to routers 306-1 and 306-2 in the IP core 302; electronic community 308-2 includes routers 306-21 and 306-22; electronic community 308-3 includes routers 306-31 and 306-32; electronic community 308-4 includes routers 306-41 and 306-42; and electronic community 308-N includes routers 306-N1 and 306-N2. Such embodiments can be useful to provide redundancy for an intranet having a number of electronic communities connected to an IP core.

An electronic community can include a number of clients on a number of local area networks (LANs) and/or a number of virtual local area networks (VLANs). Although the embodiment illustrated in FIG. 3 shows two routers per electronic community for connection to the IP core 302, embodiments are not so limited.

An electronic community can include a number of routers for routing traffic within the electronic community. For instance, an organization having many hundreds of clients divided into electronic communities, by way of example and not by way of limitation, over a geographic area, a single electronic community could include all of the clients, routers, and other network appliances in a particular building on the campus of the organization.

The present disclosure provides systems and methods for an intranet. An intranet can include a number of layer 3 networks including a number of servers associated with load balancers for advertising a virtual network address for the number of servers. The number of servers can also be interconnected via a number of layer 2 links.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An interior gateway protocol (IGP) intranet system, comprising:
   an Internet protocol (IP) core in the IGP intranet;
   a number of electronic communities external to the IP core in the IGP intranet, each having at least two layer 3 links directly to the IP core;
   a first layer 3 IGP network in the IGP intranet connected to the IP core, including:
      a first layer 4 load balancer that advertises a virtual network address and performs a health check on a first server connected to the first layer 4 load balancer; and
   a second layer 3 IGP network in the IGP intranet connected to the IP core, including:
      a second layer 4 load balancer that advertises the virtual network address; and
      a second server connected to the second layer 4 load balancer; and
   at least two layer 2 links between the first and the second servers,
      wherein the first layer 4 load balancer ceases to advertise the virtual network address when the health check indicates a particular criteria, and in response, the second layer 4 load balancer performs a controlled fallback including releasing the virtual network address back to the first layer 4 load balancer on at least one of a server-by-server and an application-by-application basis, and further wherein the first layer 4 load balancer does not cease advertising the virtual network address again for at least a given period of time.

2. The intranet system of claim 1, wherein heartbeat and cluster information is replicated across the at least two layer 2 links between the first and the second servers using low latency transport (LLT) protocol such that one version of data is stored on each of the first and the second servers.

3. The intranet system of claim 1, wherein the first layer 3 network is associated with a first data center and the second layer 3 network is associated with a second data center.

4. The intranet system of claim 1, wherein:
   the number of electronic communities include a number of clients on a number of virtual local area networks; and
   the clients have access to data stored on at least one of the first and the second servers.

5. The intranet system of claim 1, wherein:
   the first and the second layer 4 load balancers advertise the virtual network address to the number of electronic communities; and
   traffic is routed from one of the number of electronic communities to one of the first and the second servers using open shortest path first (OSPF) protocol.

6. The intranet system of claim 5, wherein:
   in response to the first layer 4 load balancer ceasing to advertise the virtual network address, the first server monitors advertisement of the virtual network address via the second layer 4 load balancer.

7. The intranet system of claim 1, wherein the system retains functionality after failure of any single system component.

8. A method for administering an interior gateway protocol (IGP) intranet, comprising:
   providing an Internet protocol (IP) core in the IGP intranet;
   connecting each of a number of electronic communities external to the IP core in the IGP intranet directly to the IP core via at least two layer 3 links;
   connecting a first layer 3 IGP network in the IGP intranet to the IP core, including:
     advertising a virtual network address via a first layer 4 load balancer;
     connecting a first server to the first layer 4 load balancer; and
     performing a health check on the first server with the first layer 4 load balancer;
   connecting a second layer 3 IGP network in the IGP intranet to the IP core, including:
     advertising the virtual network address via a second layer 4 load balancer; and
     connecting a second server to the second layer 4 load balancer; and
   connecting the first and the second servers via at least two layer 2 links,
     wherein the first layer 4 load balancer ceases to advertise the virtual network address when the health check indicates a particular criteria, and in response, the second layer 4 load balancer performs a controlled fallback including releasing the virtual network address back to the first layer 4 load balancer on at least one of a server-by-server and an application-by-application basis, and further wherein the first layer 4 load balancer does not cease advertising the virtual network address again for at least a given period of time.

9. The method of claim 8, including communicating heartbeat and cluster information across the at least two layer 2 links between the first and the second servers using low latency transport (LLT) protocol such that one version of data is stored on each of the first and the second servers.

10. The method of claim 8, including associating the first layer 3 network with a first data center and associating the second layer 3 network with a second data center.

11. The method of claim 10, including:
   connecting a number of clients on a number of virtual local area networks to the number of electronic communities; and
   providing the clients with access to data stored on at least one of the first and the second servers.

12. The method of claim 10, including:
   advertising the virtual network address to the number of electronic communities to the first and the second layer 4 load balancers; and
   routing traffic from one of the number of electronic communities to one of the first and the second servers using open shortest path first (OSPF) protocol.

13. The method of claim 8, including:
   monitoring advertisement of the virtual network address via the second layer 4 load balancer with the first server in response to the first layer 4 load balancer ceasing to advertise the virtual network address.

14. The method of claim 8, including retaining functionality of the system after failure of any single system component.

15. A non-transitory computing device readable medium having instructions stored thereon, which, when executed by a number of processors, causes a number of devices to perform a method associated with an interior gateway protocol (IGP) intranet, comprising:
   providing an Internet protocol (IP) core in the IGP intranet;
   connecting each of a number of electronic communities external to the IP core in the IGP intranet directly to the IP core via at least two layer 3 links;
   connecting a first layer 3 IGP network in the IGP intranet to the IP core, including:
     advertising a virtual network address via a first layer 4 load balancer;
     connecting a first server to the first layer 4 load balancer;
     performing a health check on the first server with the first layer 4 load balancer;
   connecting a second layer 3 IGP network in the IGP intranet to the IP core, including:
     advertising the virtual network address via a second layer 4 load balancer; and
     connecting a second server to the second layer 4 load balancer; and
   connecting the first and the second servers via at least two layer 2 links
     wherein the first layer 4 load balancer ceases to advertise the virtual network address when the health check indicates a particular criteria, and in response, the second layer 4 load balancer performs a controlled failback including releasing the virtual network address back to the first layer 4 load balancer on at least one of a server-by-server and an application-by-application basis, and further wherein the first layer 4 load balancer does not cease advertising the virtual network address again for at least a given period of time.

16. The medium of claim 15, wherein the method includes communicating heartbeat and cluster information across the at least two layer 2 links between the first and the second servers using low latency transport (LLT) protocol such that one version of data is stored on each of the first and the second servers.

17. The medium of claim 15, wherein the method includes associating the first layer 3 network with a first data center and associating the second layer 3 network with a second data center.

18. The medium of claim 17, wherein the method includes:
   connecting a number of clients on a number of virtual local area networks to the number of electronic communities; and
   providing the clients with access to data stored on at least one of the first and the second servers.

19. The medium of claim 17, wherein the method includes:
   advertising the virtual network address to the number of electronic communities to the first and the second layer 4 load balancers; and
   routing traffic from one of the number of electronic communities to one of the first and the second servers using open shortest path first (OSPF) protocol.

20. The medium of claim 15, wherein the method includes:
   monitoring advertisement of the virtual network address via the second layer 4 load balancer with the first server in response to the first layer 4 load balancer ceasing to advertise the virtual network address.

21. The medium of claim 15, wherein the method includes retaining functionality of the system after failure of any single system component.

* * * * *